United States Patent [19]
Walser et al.

[11] Patent Number: 5,234,747
[45] Date of Patent: Aug. 10, 1993

[54] HIGH STRENGTH LAMINATED VENEER LUMBER

[75] Inventors: Doanald C. Walser, Surrey; Gary E. Troughton, Vancouver; Axel W. Andersen, Burnaby, all of Canada

[73] Assignee: Forintek Canada Corporation, Vancouver, Canada

[21] Appl. No.: 652,637

[22] Filed: Feb. 8, 1991

[51] Int. Cl.$^5$ ............................................. B32B 5/12
[52] U.S. Cl. ................................... 428/215; 428/106; 428/114; 428/506; 428/529; 428/537.1; 428/218; 428/219
[58] Field of Search ..................... 428/506, 529, 537.1, 428/218, 215, 219, 106, 114; 156/299

[56] References Cited

U.S. PATENT DOCUMENTS 3,591,448 7/1971 Elmendorf ........................... 428/529
4,743,484 5/1988 Robbins ............................... 428/529

*Primary Examiner*—P. C. Sluby
*Attorney, Agent, or Firm*—Fetherstonhaugh & Company

[57] ABSTRACT

A laminated veneer lumber product utilizes low density veneers and is able to provide an edge stiffness value or MOE of at least 2,000,000 psi. This is the same strength as attained with high density veneers. The product has adjacent surface layers formed of low density incised veneer sheets having a moisture content of at least about 6% or adjacent surface layers formed of low density incised veneer sheets impregnated with phenolic resin and dried to a moisture content not exceeding about 5%. The surface layers are positioned on both sides of adjacent core layers which are either formed of high density veneer sheets or are formed of low density incised veneer sheets impregnated with a phenolic resin and dried to a moisture content not exceeding about 5%. The surface layers of low density incised veneer sheets having a moisture content of at least about 6% are densified against the core layers by at least about 5%.

13 Claims, 2 Drawing Sheets

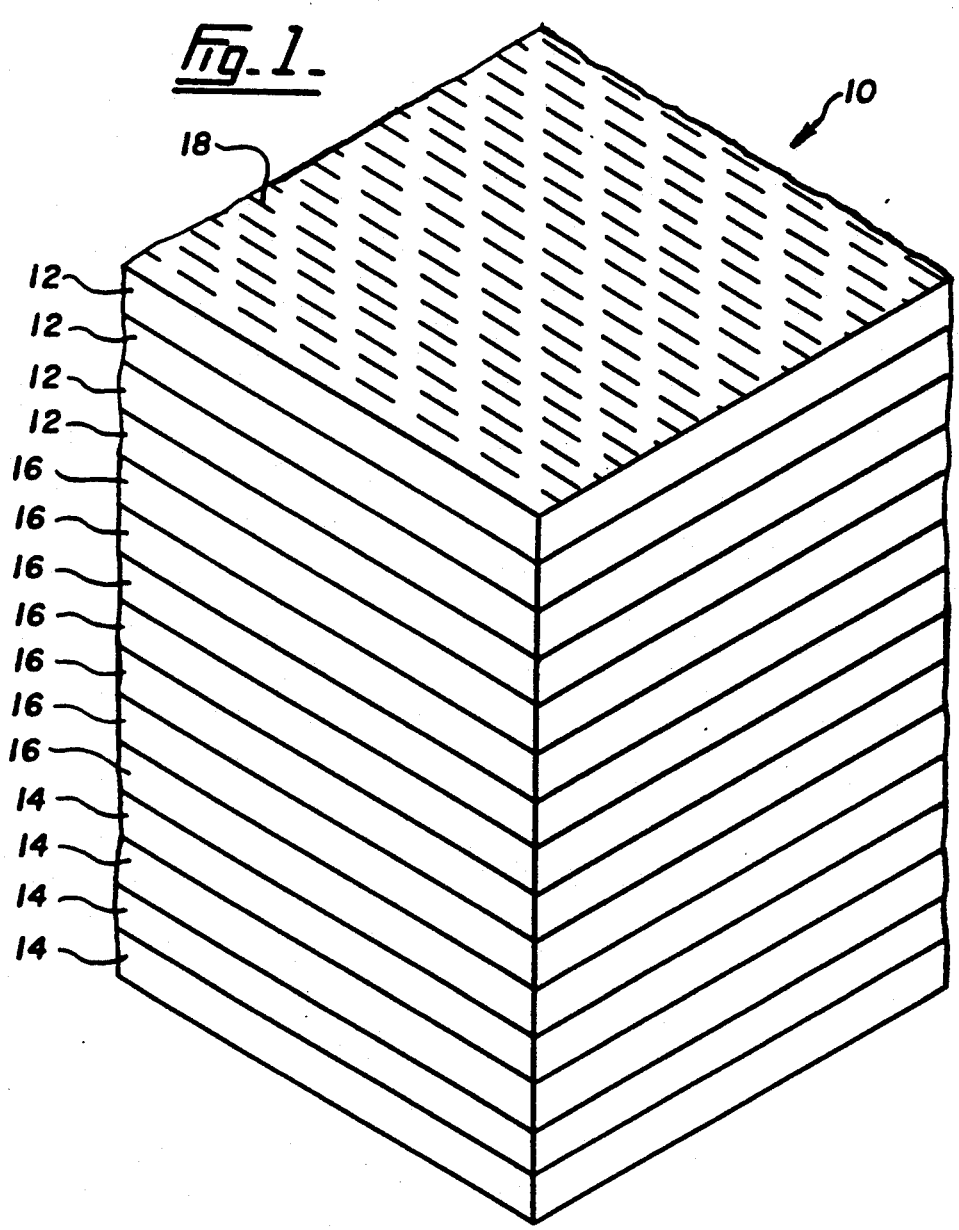

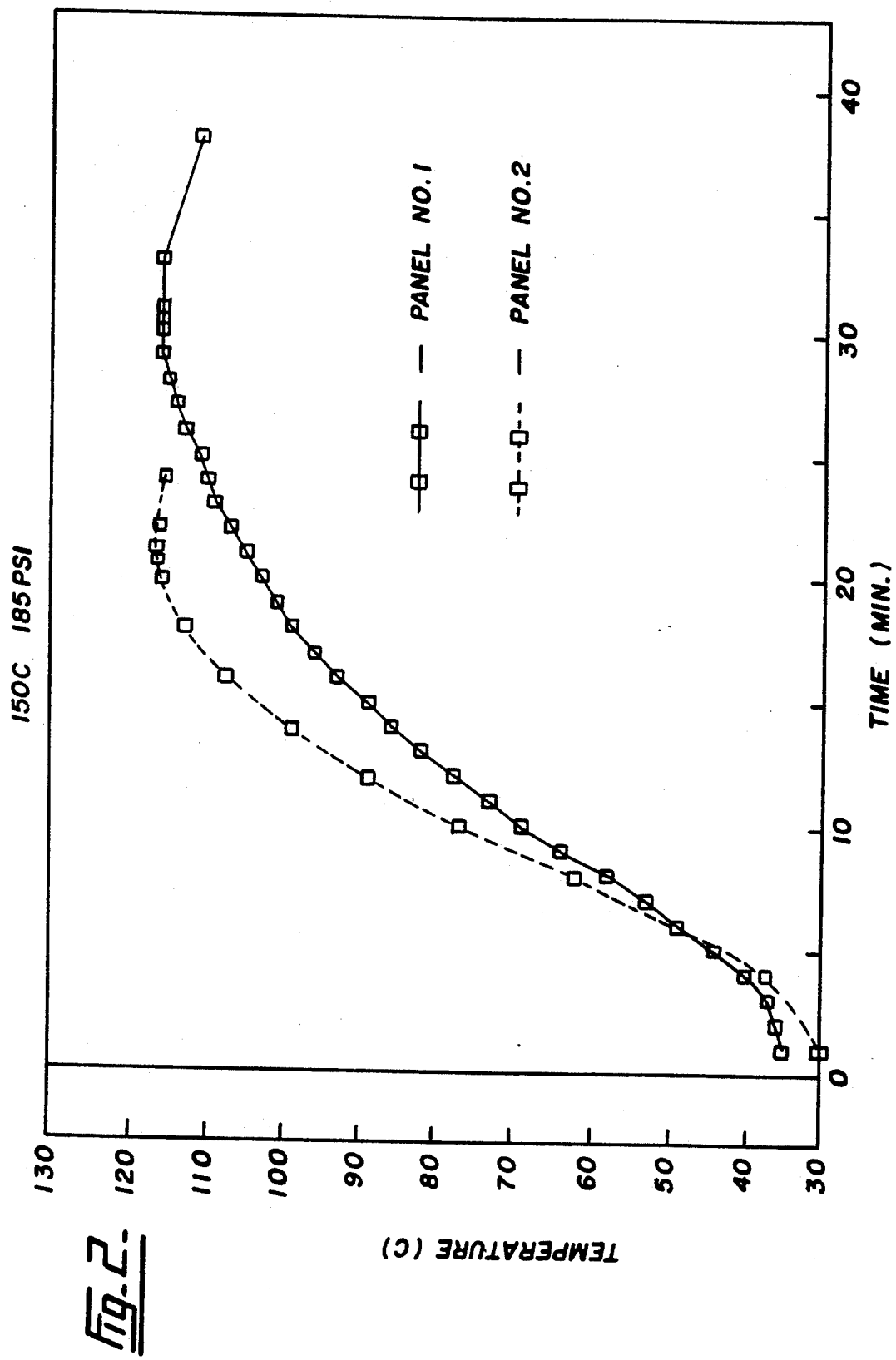

HIGH STRENGTH LAMINATED VENEER LUMBER

TECHNICAL FIELD OF THE INVENTION

The present invention relates to a laminated veneer lumber product and, more particularly, to a high strength laminated veneer lumber product produced by special species selection, lay up and densification procedures.

BACKGROUND OF THE INVENTION

Laminated veneer lumber (LVL) is composed of layers or plies of wood veneer with the layers bonded together by an adhesive resin. The woodgrain in the veneers is in the same direction for all plies so that higher strengths than solid wood is obtainable.

The present methods for preparing LVL include drying veneer sheets to a low moisture content primarily so that regular plywood resins can be applied without causing problems in the press stage. If the moisture level of the veneer sheets is too high then steam is formed when the LVL product is compressed in a press causing blowouts. The resulting board does not meet the strength requirements.

With new adhesives now available, it is not always necessary to dry veneer sheets down below about a 5% moisture content. This reduces the energy required for the drying step.

Laminated veneer lumber produced from Douglas fir and other high density wood veneers has an edge stiffness value in excess of 2,000,000 psi. This MOE FIGURE is required for structural uses. Furthermore, it has been found that an LVL produced from a low density wood such as spruce, pine or subalpine fir cannot meet the 2,000,000 psi MOE FIGURE. In many areas where Douglas fir and other high density woods are not always available there is a need to use other wood sources to produce an LVL product which does meet this required MOE standard. It has been found that utilizing mixed species of low density and high density woods cannot meet the same standard as that of Douglas fir. Laminated veneer lumber made from low density woods is well documented in the prior art.

Throughout the specification the term "low density" includes woods that fall in the range of about 0.2 to 0.4 gms/cu cm on a green volume basis. Examples are white spruce, subalpine fir and lodgepole pine. The term "high density" includes woods that fall in the range of about 0.4 to 0.6 gms/cu cm on a green volume basis. Examples are Douglas fir, larch, birch and maple.

Examples of typical wood densities on a green volume basis are as follows:

| | |
|---|---|
| White Spruce | 0.328 gms/cu cm |
| Lodgepole Pine | 0.385 gms/cu cm |
| B.C. Interior Douglas Fir | 0.440 gms/cu cm |
| B.C. Coastal Douglas Fir | 0.449 gms/cu cm |
| B.C. Larch | 0.549 gms/cu cm |

SUMMARY OF THE INVENTION

It is an aim of the present invention to provide a laminated veneer lumber product utilizing low density veneers which has an edge stiffness value or MOE of at least 2,000,000 psi. The same is achieved primarily by densifying the low density veneer sheets and either combining them in a special lay up with high density veneer sheets or, alternatively, densifying the low density veneer sheets by impregnation of resin followed by curing the resin prior to lay up. In this way the lower density veneer sheets are densified.

In one embodiment the present invention provides a laminated veneer lumber product having an MOE value of at least 2,000,000 psi, comprising at least four adjacent surface layers formed of low density incised veneer sheets, having a moisture content of at least about 6%, on both sides of at least five adjacent core layers formed of high density incised veneer sheets, having a moisture content not exceeding about 5%, the surface and core layers having adhesive resin on adjacent surfaces, and the surface layers densified by at least about 5%.

In another embodiment there is provided a laminated veneer lumber product having an MOE value of at least 2,000,000 psi comprising layers of low density incised veneer sheets impregnated with a phenolic resin, the sheets dried to a moisture content not exceeding about 5% and the phenolic resin cured, the layers formed into a lay up with adhesive resin on adjacent surfaces and pressed together.

The present invention also provides in yet a further embodiment, a method of producing a laminated veneer lumber product having a MOE value of at least 2,000,000 psi, comprising the steps of: forming a lay up of at least four adjacent surface layers of low density incised veneer sheets, having a moisture content of at least about 6%, on both sides of at least five adjacent core layers of high density incised veneer sheets, having a moisture content not exceeding about 5%, the layers having adhesive resin applied to mating surfaces, and pressing the lay up at a temperature sufficient to cure the adhesive resin and a pressure sufficient to densify the surface layers by at least about 5% to form a laminated veneer lumber product.

In a still further embodiment of the present invention there is provided a method of producing a laminated veneer lumber product having an MOE value of at least 2,000,000 psi comprising the steps of: impregnating low density incised green veneer sheets with a phenolic resin, drying the impregnated sheets to a moisture content not exceeding about 5% and curing the phenolic resin to form cured impregnated veneer sheets, forming a lay up of a plurality of the cured impregnated sheets, having adhesive resin applied to mating surfaces, and pressing the lay up at a temperature sufficient to cure the adhesive resin and form a laminated veneer lumber product.

DESCRIPTION OF THE DRAWINGS

In drawings which illustrate the embodiments of the present invention

FIG. 1 is an isometric diagrammatic view showing a laminated veneer lumber product according to one embodiment of the present invention.

FIG. 2 is a graph comparing the temperature rise in the center of the innermost glue line of a panel according to one embodiment of the invention with a control panel.

DESCRIPTION OF THE PREFERRED EMBODIMENTS

Veneer sheets from low density softwoods such as spruce, pine or subalpine fir are prepared in the normal manner. A strip is unwound in a long continuous ribbon at a preset thickness from a log mounted on a veneer lathe. The strip is cut into sheets which are dried to a moisture content in the range of about 6 to 15% with a preferred moisture content of 10%. A plywood adhesive resin is applied to surfaces of the veneer sheets and four of the low density veneer sheets were placed in a lay up to form surface layers with seven layers of a high density veneer sheet made from, in one specific embodiment, Douglas fir. The Douglas fir veneer sheets were dried to a moisture content not exceeding about 5% and preferably 2%. The seven core layers were placed on the four surface layers and then a further four surface layers placed on top to form a lay up comprising four bottom layers of low density veneer sheets, seven core layers of high density veneer sheets and four top layers of low density veneer sheets.

Prior to preparation of both the low density and high density sheets, the veneer sheets are incised in the green state prior to drying. A commercial incisor provides a suitable incision and this is necessary for the press stage to permit the steam produced by the high moisture surface layers to escape from the veneer sheets.

The lay up, which utilizes plywood adhesive resin between layers, is then placed in a press and heated under pressure. In one embodiment the temperature was 150° C. and the pressure 185 psi. The lay up remained in the press to ensure the temperature reached 116° C. in the innermost veneer layer and remained at that temperature for at least one minute. When the resin was cured then the finished product was removed from the press.

It was found that by utilizing incised veneer sheets a reduction in the time that the product remained in the press was achieved as the temperature for the innermost veneer layer heated up faster than when using non-incised veneer sheets. Temperatures much higher than 150° C. tended to cause blisters in the end product.

The pressure in the press is sufficient to densify the top and bottom surface layers against the more dense core layers. The surface veneer sheets having a high moisture content, being a low density material and also being incised all contribute to being able to compress or densify the sheets by at least about 5% of their original thickness. This densification, while reducing the overall width of the finished product, increases the strength of that product.

Testing of the finished product showed that it had an MOE in excess of 2,000,000 psi similar to LVL hardwoods or high density woods. Additional veneer sheet layers may be included in the product if the thickness is insufficient. In most cases the thickness of a veneer sheet is standard, namely, approximately ⅛ or 1/10 inch thick. These thicknesses are standard for veneer sheets made from peeling logs on a veneer lathe.

Whereas a four-seven-four lay up is disclosed, that is to say, four top surface layers, seven core layers and four bottom surface layers, this may be changed to a five-five-five lay up or a greater number of veneer sheets if increased thickness of product is required. It has been found that by utilizing the higher density and dry veneer sheets in the core layers they act as a central platen to facilitate densification of the low density high moisture outer layers. Tests were made by alternating the wood species, a low density followed by a high density, and it was found that the end product did not meet the 2,000,000 psi MOE requirement. Furthermore, the moisture content of the veneer sheets is important. The low density veneer sheets that are to be densified must have a moisture content of at least 6% and, preferably 10%. If the veneer sheets are too dry, then they will not compress or densify to provide the increased strength. Furthermore, if the core veneers are too wet, then they will not act as a platen to assist in densifying the low density surface layers.

The pressure in the press is important, it must maintain a pressure sufficient to densify the surface layers by 5% of their original thickness. It has been found that 185 to 200 psi pressure is satisfactory for such a press. The time of press varies somewhat however, by utilizing incised veneer sheets times can be reduced to 20 minutes from almost 27 minutes now required for making non-incised LVL products.

To produce the high strength LVL product by another method, low density veneer sheets which may be a mixture of spruce, pine and subalpine fir or other softwood low density species, are taken in the green stage, that is to say, just as they are peeled off the veneer lathe and incised on a regular incising machine. In some cases the sheets are wet to ensure the a moisture content is at least 20%. An adhesive resin, preferably a commercially available phenol formaldehyde resin, is applied to both sides of the green veneer sheets by a rubber roller glue spreader or other suitable means at a rate of 30 pounds per thousand square feet of double glue line. The resin is applied in solution at 22% PF solids and in other tests it is found that an application level of the resin may be increased to as much as 68 pounds per thousand square feet of double glue line.

The impregnated green veneer sheets are dried, preferably oven dried, at 150° C. to cure the resin thus providing a resin impregnated veneer sheet wherein the resin itself is cured. The veneer sheets are dried so that they have a moisture content less than about 5% and preferably about 2%. This produces a denser sheet which in turn has more strength.

A lay up of cured impregnated veneer sheets was prepared. The number of sheets was at least fifteen with the grain all in the same direction. The sheets had an adhesive resin coated on mating surfaces. The lay up is placed in a press, compressed and heated so that the resin cured throughout the product. Tests of the end product showed that the MOE of 2,000,000 psi is achieved with the individual sheets all having increased density due to the impregnated resin therein.

Various arrangements of cured impregnated resin veneer sheets may be made. In one embodiment the cured impregnated low density veneer sheets replace the high density core layers from the previously described product. The cured impregnated veneer sheets are dried and therefore do not easily compress. They act as a platen for compressing the top and bottom surface layers of high moisture low density veneer sheets. In a still further embodiment the cured impregnated resin sheets replaced the top and bottom surface layers leaving the high density dry veneer sheets core layers still in place. In this situation it was not necessary to further densify the top and bottom surface layers as they were already densified due to being impregnated with the adhesive resin.

FIG. 1 illustrates one example of a laminated veneer lumber product according to the present invention wherein the product 10 has four top surface layers 12 which are formed of incised low density veneer sheets, specifically spruce veneer sheets, which have a moisture content in the range of about 6% to 15%. Four bottom surface layers 14 are the same veneer sheets as the top surface layers 12, and seven core layers 16 are formed of incised high density veneer sheets, specifically Douglas fir veneer sheets, which before lay up had a moisture content of less than 5% and preferably about 2%. After being pressed the top surface layers 12 and the bottom surface layers 14 are densified by at least 5%. Incisions 18 can be seen on the top surface of the top layer 12. The incisions from an incisor assist in fast heating of the lay up and permit removal of steam and moisture from the inner layers to aid in preventing blisters forming and blowouts.

Strength properties of dry small clear wood specimens are shown in Table 1 below. These strength properties are for comparison with the laminated veneer lumber products produced in the examples disclosed hereafter.

TABLE I

STRENGTH OF PROPERTIES OF DRY SMALL CLEAR WOOD SPECIMENS

| | | (Strength) Modulus of Rupture (MOR) (psi) | (Stiffness) Modulus of Elasticity (MOE) (psi) |
|---|---|---|---|
| Western larch | | 15,500 | 2,080,000 |
| Douglas fir | | 12,800 | 1,970,000 |
| Western hemlock | | 11,800 | 1,790,000 |
| Lodgepole pine | | 11,000 | 1,580,000 |
| Western white spruce | | 9,100 | 1,450,000 |
| Balsam fir | | 8,500 | 1,400,000 |
| Subalpine fir | | 8,200 | 1,480,000 |
| Southern Pine Species | | | |
| Slash | Southern (S.) pine | 16,300 | 1,980,000 |
| Longleaf | S. pine | 14,500 | 1,980,000 |
| Shortleaf | S. pine | 13,100 | 1,750,000 |
| Virginia | S. pine | 13,000 | 1,520,000 |
| Loblolly | S. pine | 12,800 | 1,790,000 |
| Pond | S. pine | 11,600 | 1,750,000 |
| Sand | S. pine | 11,600 | 1,410,000 |
| Pitch | S. pine | 10,800 | 1,430,000 |
| Spruce | S. pine | 10,400 | 1,230,000 |

Reference
Wood Handbook. Wood as an Engineering Material. U.S. Dept. of Agriculture. Forest Service prepared by Forest Products laboratory, Madison, Wisconsin.

EXAMPLE 1

A mix of spruce, pine and subalpine fir veneer sheets, ⅛ inch thick, in the green state were cut into 15 inch squares and kept cool and wet until they could be air dried to approximately 10% moisture content. Control veneer sheets were oven dried to 2 to 4% moisture content. Douglas fir veneer sheets, also ⅛ inch thick, were dried to 2 to 4% moisture content. Panels were prepared by spreading a standard plywood glue mix. The glue mix was applied to 68 pounds per thousand square feet of double glue line with 22% PF solids. Open assembly time of a lay up was kept between 10 and 15 minutes. No pre-press was used and panels were pressed at the temperature of 150° C. until the center glue line had reached 116° C. for one minute. Pressure used varied between 180 and 200 psi. All panels were allowed to air cool before cutting for test samples.

For sampling at least ten samples were cut from each panel for small scale edge bending. The sample width equalled panel thickness. The sample thickness was 0.2 inches plus/minus 5% chosen to comply with CSA standard span to depth ratio. Panels were tested according to CSA methods. The testing procedure followed CSA standard CAN3-01880-M78.

In the first example a lay up was prepared with four top and bottom surface layers made from a spruce, pine, subalpine fir mix of veneer sheets having a moisture content of 10%. Seven dry Douglas fir veneers were used as the core to produce a four-seven-four configuration. The Douglas fir veneers were dried to a 2% to 4% moisture content. The veneers were laid in a balanced construction with all the lathe checks oriented towards the center of the panel. The panels were allowed a 10 to 15 minute open assembly time before they were hot pressed at 150° C. and 200 psi pressure. The internal temperatures were monitored with a thermocouple and the panel was removed from the press when the core temperature reached 116° C. for one minute. The panels were allowed to air cool before cutting and testing. The MOE values are shown in Table 2.

TABLE 2

| MOE values for laboratory construction LVL samples | |
|---|---|
| | 2,258,000 psi |
| | 2,241,000 |
| | 2,366,000 |
| | 2,286,000 |
| | 2,277,000 |
| | 2,182,000 |
| | 1,830,000 |
| | 2,044,000 |
| | 1,953,000 |
| | 2,098,000 |
| | 1,933,000 |
| | 2,053,000 |
| | 2,086,000 |
| | 1,973,000 |
| | 2,026,000 |
| | 2,114,000 |
| | 2,111,000 |
| | 1,964,000 |
| | 2,086,000 |
| | 2,448,000 |
| Average | 2,116,450 psi |

Edge bending samples to produce the FIGURES of Table 2 were 0.2 inches thick and 15 inches in length cut in the woodgrain direction from 15×15 inch laboratory panels. The bending tests were conducted using an Instron testing machine. The span was 5 inches giving a span to depth of 25. The head speed was 0.1 inch per minute and the MOE was calculated for each sample. As can be seen the average MOE was well in excess of 2,000,000 psi.

EXAMPLE 2

This example represents a control for Example 1. Eight dry low density veneer sheets at a moisture content of from 2% to 4% and seven dry Douglas fir veneer sheets having a moisture content of from 2% to 4% were laminated together using the same glue level and method as Example 1. The panels were laid up in alternating pattern, one low density sheet followed by one high density sheet, to give a balanced construction 15 ply panel. The MOE values are given in Table 3 and, as can be seen, the average MOE is below the 2,000,000 psi.

TABLE 3

| MOE values for laboratory LVL control samples |
|---|
| 1,809,000 psi |
| 1,774,000 |
| 1,739,000 |
| 1,839,000 |
| 1,788,000 |
| 1,751,000 |
| 1,715,000 |
| 1,789,000 |
| 1,790,000 |
| 1,854,000 |

TABLE 3-continued

MOE values for laboratory LVL control samples

| | |
|---|---|
| Average | 1,784,800 psi |

EXAMPLE 3

The same type of veneer sheets as used in Example 1 were used in a plywood mill test. The veneer sheets were incised on a production run incisor and dried in the normal manner at 150° C. Some veneer sheets were processed very rapidly to obtain approximately 10% moisture content and others were dried in the usual manner to give moisture contents less than 7%. The low density veneer sheets were separated after drying in order to use only spruce veneer sheets for the test run. Veneer sheets were sorted using a portable moisture meter into a dry (2% to 4% m.c.) veneer sheets and wet veneer sheets (6% to 15% m.c.). These veneer sheets were stacked by hand to give the desired panel constructions.

A set of nine panels was manufactured with four wet (6% to 15% m.c.) spruce veneer sheets as bottom surface layers. Seven dry Douglas fir veneer sheets (2% to 4% m.c.) as core layers and four wet spruce veneer sheets (6% to 15% m.c.) as top surface layers. The glue mix used was the same mix used on the laboratory panels. It was applied using a commercial plywood lay up line by spraying the glue mix on the veneer sheets at a rate of 38 pounds per thousand square feet of single glue line at 22% PF solids. The panels were prepressed according to normal mill procedure and they were then hot pressed at 150° C. and 200 psi pressure in a 20 opening press. The core temperature was monitored by thermocouple and the panels were removed from the press when the core temperature reached 116° C. The panels were given a short air cooling period before they were stored away from the press area.

The panels were cut when cooled. One foot was trimmed from the edge and two eight foot only 2×4's were cut for testing from the remainder of the panel. The testing procedure for determining MOE was ASTM D 198-84. The MOE values are given in Table 4 and as can be seen the average MOE value is above 2,000,000 psi.

TABLE 4

MOE values for commercially prepared special construction LVL samples

| | |
|---|---|
| | 1,973,038 psi |
| | 1,901,721 |
| | 2,072,695 |
| | 2,250,884 |
| | 2,223,909 |
| | 1,626,215 |
| | 1,976,020 |
| | 2,309,256 |
| | 2,093,350 |
| Average | 2,047,454 psi |

EXAMPLE 4

A set of nine panels was manufactured to serve as a control for Example 3. Eight spruce veneer sheets were laid up alternatively with seven Douglas fir veneer sheets, one spruce followed by one Douglas fir, etc. The same glue mix application level and method were used as in Example 3. The testing followed a similar pattern. The MOE values are given in Table 5 and, as can be seen, the average is below 2,000,000 psi.

TABLE 5

MOE values for commercially prepared LVL control samples

| | |
|---|---|
| | 1,827,258 psi |
| | 1,605,011 |
| | 2,346,937 |
| | 2,059,657 |
| | 2,073,802 |
| | 1,890,681 |
| | 2,134,906 |
| | 1,673,379 |
| | 1,768,163 |
| Average | 1,931,090 psi |

EXAMPLE 5

Low density spruce, pine, subalpine fir veneer sheets (15 inches by 15 inches) in the green state were run under a rubber roller glue spreader to coat them with 30 pounds per thousand square feet of double glue line of phenol formaldehyde plywood resin having a 22% PF solids. The resin was a commercial plywood resin. This resin was chosen because of its ability to penetrate into the wood surface.

One panel was made up of veneer sheets with a heavier resin application level of 45 to 50 pounds per thousand square feet of double glue line of PF plywood resin to test the sensitivity of MOE to spread level.

The veneer sheet were then dried in a forced air oven at 150° C. to approximately 2% moisture content. At this temperature the resin was cured to form cured impregnated veneer sheets.

Five of the cured impregnated veneer sheets were then used as top surface layers, with five dry untreated Douglas fir veneer sheets as core layers and five cured impregnated veneer sheets as bottom surface layers. The veneer sheets were laminated with a plywood mill glue mix and hot pressed at 150° C. and 180 psi pressure. The internal temperature was monitored and the panels were removed after the core reached 116° C. The testing followed the same pattern as Examples 1, 2 and 3. The MOE values are illustrated in Table 6 and, as can be seen, the average MOE value is above 2,000,000 psi.

TABLE 6

MOE values for laboratory treated LVL samples

| | |
|---|---|
| | 1,966,000 psi |
| | 2,080,000 |
| | 2,106,000 |
| | 2,102,000 |
| | 2,064,000 |
| | 2,021,000 |
| | 2,110,000 |
| | 2,077,000 |
| | 2,128,000 |
| | 2,039,000 |
| Average | 2,069,300 psi |

EXAMPLE 6

Fifteen spruce, pine, subalpine fir mixture of veneer sheets were impregnated in the green state as described in Example 5. The veneer sheets were than laminated together without the use of any Douglas fir veneer sheets following the same procedure as for Example 5. The MOE values are given in Table 7 and, as can be seen, all the FIGURES were above 2,000,000 psi.

TABLE 7

MOE values for laboratory treated LVL samples

| | |
|---|---|
| | 2,093,000 psi |
| | 2,063,000 |
| | 2,012,000 |
| | 2,037,000 |
| | 2,035,000 |
| | 2,098,000 |
| | 2,148,000 |
| | 2,036,000 |
| | 2,080,000 |
| | 2,156,000 |
| Average | 2,075,800 psi |

EXAMPLE 7

Laboratory panels were compared with panels manufactured with all dry untreated spruce, pine, subalpine fir mixture of veneer sheets. All laborator panels were laminated with the same glue and hot pressed as described in Example 5 and the testing followed the same procedure. The MOE values are given in Table 8. Densification of the outer layers did not occur thus the MOE values are below 2,000,000 psi.

TABLE 8

MOE values for laboratory LVL control samples

| | |
|---|---|
| | 1,824,000 psi |
| | 1,885,000 |
| | 1,793,000 |
| | 1,868,000 |
| | 1,740,000 |
| | 1,780,000 |
| | 1,713,000 |
| | 1,597,000 |
| | 1,607,000 |
| | 1,588,000 |
| Average | 1,739,500 psi |

One panel was prepared of a spruce veneer sheet, oven dried and then spread with a glue mix at 68 pounds per thousand square feet of double glue line of PF resin. The panel was oven dried to cure the glue. FIG. 2 shows the temperature rise in the center of the innermost glue line of a thirteen ply laminated veneer lumber sample made with incised 15×15 inch spruce veneer sheets. Panel No. 1, the control panel, was made with all incised spruce veneer sheets at 2% moisture content and panel No. 2 was made with four layers of incised spruce face and back surface veneer sheets at 10% moisture content and the remaining five layers of incised Douglas fir core veneer sheets at 2% moisture content. The panels were pressed at 150° C. and 185 psi pressure and a copper-constantan thermocouple was used to measure the temperature. The higher face and back moisture content incised veneer sheets produced steam which helped accelerate the temperature rise in the panel. Thus it took 27 minutes to reach 115° C. in the control panel No. 1 whereas it took only 20 minutes to reach 115° C. in panel No. 2 containing the higher moisture content face and back surface veneer sheets. These results demonstrate the benefit of producing laminated veneer lumber products with high moisture content veneer sheets in the face and back surface layers and lower moisture content veneer sheets in the core layers.

Various changes may be made to the embodiment shown herein without departing from the scope of the present invention which is limited only by the following claims.

The embodiments of the present invention in which an exclusive property or privilege is claimed are defined as follows:

1. A laminated veneer lumber product having an MOE value of at least 2,000,000 psi, comprising:
    at least four adjacent surface layers formed of low density incised veneer sheets, having a moisture content of at least about 6%, on both sides of least five adjacent core layers formed of high density incised veneer sheets, having a moisture content not exceeding about 5%, all of the sheets having substantially the same thickness, the surface and core layers having adhesive resin on adjacent surfaces, and the surface layers densified by at least about 5%.

2. The laminated veneer lumber product according to claim 1 wherein the low density incised veneer sheets are selected from the species consisting of spruce, pine and subalpine fir.

3. The laminated veneer lumber product according to claim 2 wherein the high density veneer sheets are selected from the species consisting of Douglas fir, larch, birch and maple.

4. The laminated veneer lumber product according to claim 1 including four adjacent surface layers on both sides of seven adjacent core layers.

5. The laminated veneer lumber product according to claim 1 including five adjacent surface layers on both sides of five adjacent core layers.

6. The laminated veneer lumber product according to claim 1 wherein the moisture content of the low density incised veneer sheets is in the range of about 6% to 15%.

7. A laminated veneer lumber product having an MOE value of at least 2,000,000 psi, comprising:
    layers of low density incised veneer sheets impregnated with a phenolic resin, the sheets dried to a moisture content not exceeding about 5% and the phenolic resin cured, all of the sheets having substantially the same thickness, the layers formed into a layer up with adhesive resin on adjacent surfaces and pressed together.

8. The laminated veneer lumber product according to claim 7 wherein the low density incised veneer sheets are selected from the species consisting of spruce, pine and subalpine fir.

9. A laminated veneer lumber product having an MOE value of at least 2,000,000 psi, comprising:
    at least four adjacent surface layers formed of low density incised veneer sheets impregnated with a phenolic resin, the surface layers dried to a moisture content not exceeding about 5% and the phenolic resin being cured, the four adjacent surface layers on both sides of at least five adjacent core layers formed of high density incised veneer sheets, having a moisture content not exceeding about 5%, all of the sheets having substantially the same thickness, the layers having adhesive resin on adjacent surfaces.

10. The laminated veneer lumber product according to claim 9 wherein the low density incised veneer sheets are selected from the species consisting of spruce, pine and subalpine fir.

11. The laminated veneer lumber product according to claim 10 wherein the high density veneer sheets are selected from the species consisting of Douglas fir, larch, birch and maple.

12. A laminated veneer lumber product having an MOE value of at least 2,000,000 psi, comprising:
    at least four adjacent surface layers formed of low density incised veneer sheets having a moisture content of at least about 6%, on both sides of at least five adjacent core layers formed of low density incised veneer sheets impregnated with a phenolic resin, all of the sheets having substantially the same thickness, the core layers dried to a moisture content not exceeding about 5%, and the phenolic resin being cured, adhesive resin applied on adjacent surfaces of surface layers and core layers, and the surface layers densified by at least about 5%.

13. The laminated veneer lumber product according to claim 12 wherein the low density incised veneer sheets are selected from the species consisting of spruce, pine and subalpine fir.

* * * * *